(12) United States Patent
Levi et al.

(10) Patent No.: US 6,745,668 B2
(45) Date of Patent: Jun. 8, 2004

(54) UNIT FOR MAKING BEVERAGES BY BREWING AND MACHINE INCORPORATING SAME

(75) Inventors: Jean-Pierre Levi, Nice (FR); Mario Levi, Nice (FR)

(73) Assignee: Unic S.A.S., Carros (FR)

( * ) Notice: Subject to any disclaimer, the term of this patent is extended or adjusted under 35 U.S.C. 154(b) by 31 days.

(21) Appl. No.: 10/181,730

(22) PCT Filed: Dec. 29, 2000

(86) PCT No.: PCT/FR00/03734

§ 371 (c)(1),
(2), (4) Date: Jul. 22, 2002

(87) PCT Pub. No.: WO01/54550

PCT Pub. Date: Aug. 2, 2001

(65) Prior Publication Data

US 2003/0000393 A1 Jan. 2, 2003

(30) Foreign Application Priority Data

Jan. 24, 2000 (FR) .............................. 00 00880

(51) Int. Cl.$^7$ .................. A47J 31/24; A47J 31/40
(52) U.S. Cl. .................. 99/289 P; 99/289 R; 99/291
(58) Field of Search ................... 99/289 P, 289 R, 99/291, 300, 302 R, 303, 305, 280, 281, 282

(56) References Cited

U.S. PATENT DOCUMENTS

| | | | | |
|---|---|---|---|---|
| 1,390,008 A | * | 9/1921 | Arduino | 99/286 |
| 2,014,325 A | * | 9/1935 | Hanes | 99/289 R |
| 3,537,383 A | | 11/1970 | Croce | |
| 4,829,889 A | | 5/1989 | Takeuchi et al. | |
| 5,622,099 A | * | 4/1997 | Frei | 99/287 |

FOREIGN PATENT DOCUMENTS

| | | |
|---|---|---|
| CH | 674703 A5 | 7/1990 |
| DE | 1918425 | 10/1970 |

* cited by examiner

Primary Examiner—Reginald L. Alexander
(74) Attorney, Agent, or Firm—Young & Thompson

(57) ABSTRACT

Unit for making beverages by brewing of a dose of product to be brewed, includes several brewing chambers (1a, 1b), each provided with a receptacle for the dose and elements for injecting hot water into each of the brewing chambers. According to the invention, the brewing chambers (1a, 1b) are juxtaposed and topped by a mobile plate (4) provided with an orifice designed to be positioned opposite the brewing chambers (1a, 1b) for opening or closing the brewing chambers (1a, 1b) depending on its position. The invention also concerns a machine for making espresso coffee incorporating the unit.

17 Claims, 4 Drawing Sheets

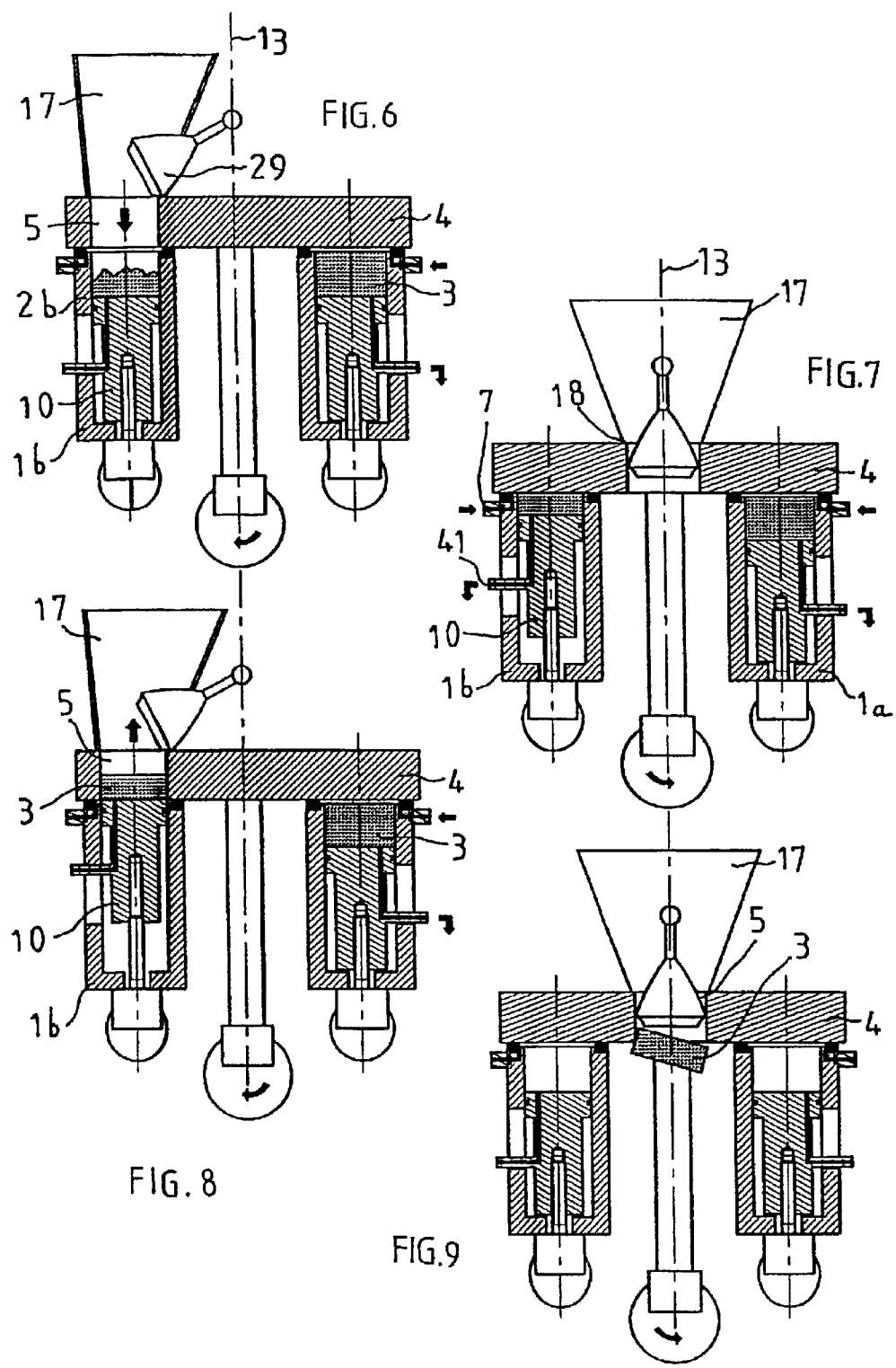

UNIT FOR MAKING BEVERAGES BY BREWING AND MACHINE INCORPORATING SAME

BACKGROUND OF THE INVENTION

The present invention concerns a unit for making beverages by brewing of a dose of product to be brewed.

It also concerns an automatic machine for making beverages like espresso coffee, incorporating the unit described in the invention.

According to the invention, the unit comprises several brewing chambers, each provided with a receptacle for the dose and means for injecting hot water into each of the brewing chambers.

The invention will be particularly applicable to the field of making coffee-based beverages of the espresso type.

It may be used to build and operate an automatic machine that is very practical to use and highly productive.

Automatic unit for making espresso coffee are already known.

In that respect, the document EP-A-0.450.200 discloses an automatic unit for espresso coffee comprises a pressure chamber for the preparation of the coffee, this pressure chamber comprising a closing/opening element for the insertion and removal of the coffee powder and at least one adjustable movable wall defining the volume of the chamber.

In the document, the single brewing chamber is closed at the top by a pivoting element and at the bottom by a mobile piston.

The pivoting element can adopt an opened position to the admission or the evacuation of the ground.

However, the unit has the drawback of only making it possible to make a single coffee or a double coffee by increasing the quantity of grounds in the brewing chamber.

It does not allow associating several brewing chambers, which means that the efficiency of the machine is conventional, i.e. it only completes one brewing operation at a time.

Besides, the cost of this unit design is high, particularly because of the form of the mobile piston and the closing system at the top of the chamber.

It is also known the document EP-A-0.604.350, which describes a coffee machine that includes two receptacles with a dose of coffee each, two pistons that press down the said dose of coffee and two ejectors. The machine is used to prepare one or two coffees at the same time and three coffees if one of the receptacles has a double capacity and a double outlet. Each seat or base mounted to turn along with the main shaft has a cavity in which a support for a filter is positioned, through which the brew passes. The angular distance between the receptacles is the same as that of the pressure pistons so that they are opposite the said receptacles at the same time. The ejectors intended for the brewed coffee dose are fitted with the same angular distance.

Two brewing chambers can be formed according to this document by doubling all the essential means—piston, receptacle and ejector.

Even though it provides for building two brewing chambers, the machine has the drawback of increasing the number of constituent parts required for that use.

For instance, all parts come in a pair which is heavy, complicated and costly.

Further, the machine only enables the coupled operating of the brewing chambers—if you wish to use them both, they must follow simultaneous identical cycles.

As a result, the machine does not make for flexible use.

The brewing chambers cannot in fact operate independently.

Document CH-A-674703 also discloses a machine with several brewing chambers.

The chambers move on a base with several holes for letting out the coffee of the used grounds, from each chamber.

The chambers move individually using a complex organization which does not enable fully simultaneous operation or making a common area for removing the used grounds.

Document U.S. Pat. No. 4,829,889 shows a highly specific application mechanism, where cartridges of ground coffee are made to move. A rotary part with holes is provided to move the cartridge from one station to another. There is only one brewing chamber and the working of the mechanism is closely related to the structure of the cartridges used.

SUMMARY OF THE INVENTION

The present invention is aimed at making up for the drawbacks of currently known unit and automatic coffee machines.

To do so, it has at least two brewing chambers that are opened and closed by a mobile plate with an orifice.

In that way, a unit is made with several brewing chambers, which increases productivity.

Further, the assembly unifies the machine in order not to multiply the number of constituent elements by the number of brewing chambers required.

According to the invention a simple machine is achieved with compact dimensions containing several brewing chambers.

The invention also offers the benefit of having different elements common to the brewing chambers, particularly the mobile plate or the automatic control means, that may be grouped.

The other aim of the invention is to make the use of the unit more flexible by enabling it to make just one brew or two simultaneous brews or even make a brew while the other chamber is being filled with coffee or emptied of the used grounds.

As a result, the present invention offers the possibility of working concurrently on several brewing chambers.

That adds flexibility to the productivity obtained.

Other aims and benefits will emerge during the description below, which is however not limitative.

The unit for making beverages by brewing of a dose of product to be brewed comprising several brewing chambers, each provided with a receptacle for the dose and means to inject hot water in each of the brewing chambers is characterised by the fact that the brewing chambers are juxtaposed and topped by a mobile plate with an orifice designed to be positioned opposite the brewing chambers for opening or closing the brewing chambers (1a, 1b) depending on its position.

The unit according to the invention may be embodied in the modes outlined below:
  there is a seal between each brewing chamber and the mobile plate;
  the injection means are composed of radial supply circuits that open out into each brewing chamber;

the lower wall of the receptacle is created by a mobile piston that moves between a position for receiving the dose to a position for ejecting the dose into the orifice when it is used;

the shape of the section of the orifice is identical to that of the opening of the brewing chambers, while its dimensions are slightly greater;

the perimeter of the orifice is at least as thick as the maximum height of the used dose ejected after brewing, the used dose is ejected by gravity when the mobile plate moves;

the plate is a mobile disc rotating in a horizontal plane, the said unit has two brewing chambers positioned under the plate so that they are in the path of the orifice;

it comprises the automatic means to load a dose of a product to be brewed, including:

an assembly for supplying the brewing product that opens out onto at least one supply channel, a funnel that receives the dose by gravity from the supply channel/s, the lower end of which opens at the mobile plate, the means to position the funnel above one of the brewing chambers in order to load a dose in one of the brewing chambers when the orifice is positioned above it;

the shape and dimensions of the lower end of the funnel are more or less similar to those of the openings of the brewing chambers;

the means to position the funnel opposite to one of the two brewing chambers comprise:

a vertical shaft pivot link with a return mechanism, a driving pin fixed on the outer wall of the funnel that works along with an annular part on the perimeter of the mobile plate to direct the funnel into one of the three positions below:

the idle position when the driving pin is fitted in a notch formed on the annular part, the brewing chambers being placed symmetrically on either side of the idle position;

the position opposite to one of the brewing chambers when the driving pin presses on the portion of the annual part that is located on the first side of the notch;

the position opposite to the other brewing chamber when the driving pin presses on the portion of the annular part that is located on the other side of the notch;

the means to make the funnel vibrate in order to make the brewing material drop down.

at least one area of each portion of the annular part is raised to make the funnel vibrate when the driving pin passes over it;

the means to clean the orifice when the used dose is removed, including the following:

a weight, the section of which has the same shape and is slightly smaller than the section of the orifice, the means to suspend the weight so that it can be moved in and out of the orifice.

the suspension means include:

a horizontal shaft pivot link, an articulation to lower or raise the weight so as to insert it into the orifice and take it out when the mobile plate moves;

the weight has a sectional profile in order to facilitate insertion into and removal from the orifice;

the weight is fitted on a rod connected to the horizontal shaft pivot by an annular linear link in order to make it easier for it to move in and out of the orifice.

The invention also concerns an automatic machine for making espresso type beverages with at least one unit as described in the invention.

BRIEF DESCRIPTION OF THE DRAWINGS

The drawings enclosed are provided as examples for guidance and are not limitative. They represent the preferred mode of embodiment of the invention. They make it easier to understand the invention.

FIGS. 6 to 9 are schematic sectional views showing different phases of unit operation as described in the invention.

DETAILED DESCRIPTION OF THE PREFERRED EMBODIMENTS

Below is a description of the preferred embodiment mode as illustrated in FIGS. 1 to 9.

It includes a unit for brewing beverages, particularly coffee of the espresso type.

The unit according to the invention includes several brewing chambers in which product such as ground coffee is brewed.

All the figures show the embodiment with two brewing chambers referenced 1a, 1b.

Both chambers include receptacles referenced 2a and 2b, the interior volume of which can receive a dose 3 of product to be brewed.

FIG. 6 shows the reception of the dose in the receptacle.

Means to inject hot water for brewing are also present in each of the brewing chambers, 1aand 1b.

The preferred mode of embodiment will be described below.

Figure 2:
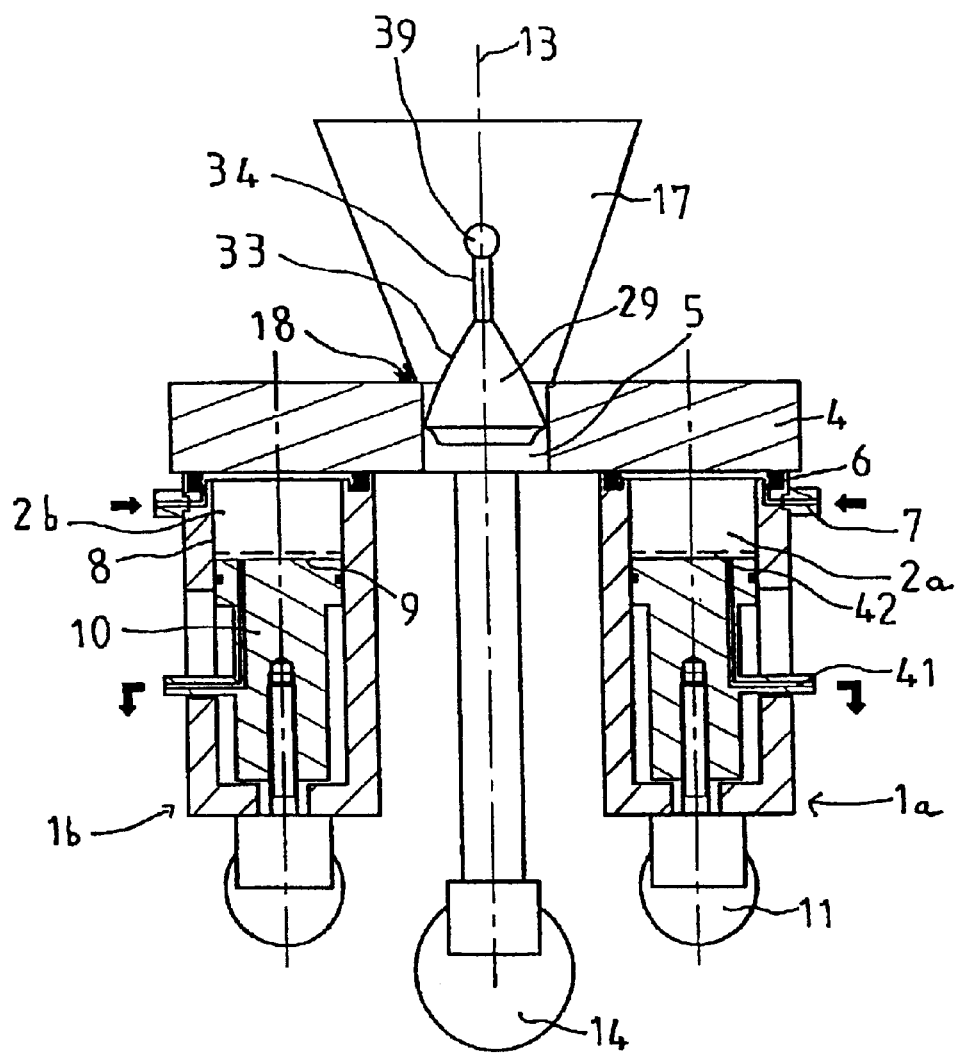
FIG. 2 is a sectional view of the brewing chambers of the embodiment of FIG. 1.

According to the invention, brewing chambers 1a and 1b are juxtaposed as shown in FIG. 2.

Besides, they are topped by a mobile plate 4 with an orifice 5.

Depending on the position of the mobile plate 4, orifice 5 may be positioned opposite of one of the brewing chambers 1a or 1b so as to open it.

When orifice 5 is not positioned opposite of a brewing chamber 1a or 1b, the relevant chamber is closed.

FIG. 2 shows the case of two closed brewing chambers 1a and 1b.

FIG. 6 shows another possibility where one of the chambers (1b) is open.

It appears quite clearly that the formation of a single plate 4 provided with an orifice 5 assure openings and closings phase of the both brewing chambers, 1a and 1b.

In the preferred embodiment mode shown in FIGS. 1–9, plate 4 rotates along an axis 13, shown particularly in FIG. 2.

However, other forms of embodiment are possible, particularly those that enable the displacement of plate 4.

In the preferred embodiment, the closing of brewing chambers 1a and 1b is sealed by a seal 6 between each chamber 1a and 1b and mobile plate 4.

Seal 6 is particularly shown in FIG. 2 in the form of an o-ring seal, as an example.

FIG. 2 also shows the means to inject hot water, made up of radial supply circuits 7 that open out into each brewing chamber, 1a and 1b.

Figure 1:
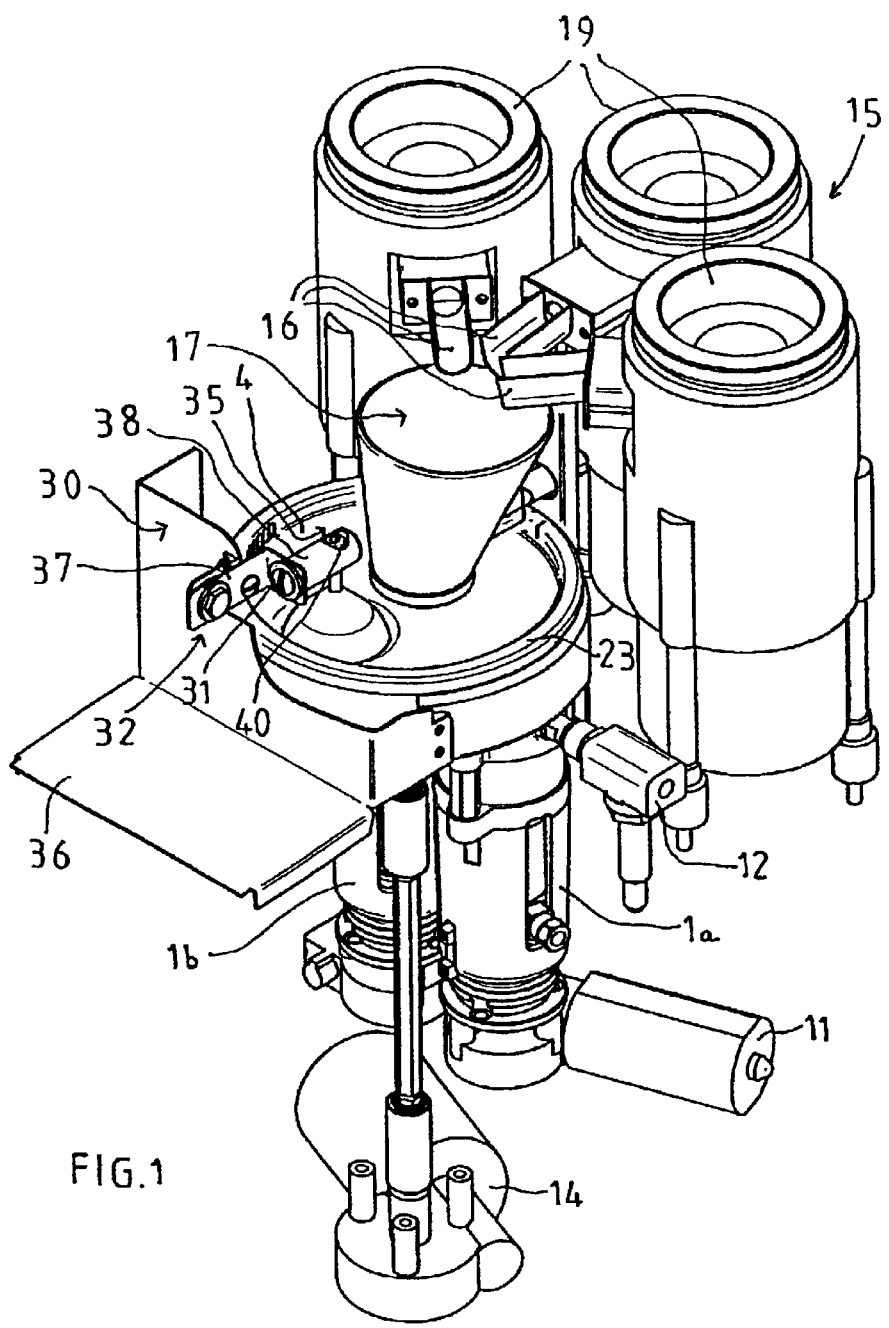
FIG. 1 is a general perspective view of a unit for making beverages as described in the invention, in a particular mode of embodiment.

Before these radial supply circuits 7, the means of injection may be made up with the usual method, particularly by using a pump and solenoid valve brewing system 12 as shown in FIG. 1.

Radial injection of hot water makes it possible to avoid the need for plate 4 to bear the means of injection.

The preferred embodiment shown in FIG. 2 also includes a circuit for letting out the brewed beverage through an outlet referenced 41.

As part of that system, the removal circuit to outlet 41 includes a mobile piston 10 that makes up lower wall 9 of the receptacles 2a and 2b of the brewing chambers 1a and 1b.

Preferentially, mobile piston 10 has a filter 42 that lets the beverage through to outlet 41.

The use of a mobile piston 10 makes it possible to vary the interior volume of receptacles 2a and 2b.

It can also be adapted on the basis of the dose 3 integrated into the receptacle or the required tamping of the grounds.

Besides, the displacement of piston 10 means that it can pass from a position for receiving dose 3 and a position for ejecting dose 3 into orifice 5 when it is used.

By reference to FIGS. 6–9, it may be seen that brewing chamber 1b of FIG. 6 shows the position of mobile piston 10 to receive dose 3.

In FIG. 7, that same brewing chamber 1b is closed and mobile piston 10 is raised to tamp dose 3.

After the brewing is completed, FIG. 8 shows the ejection of dose 3 out of receptacle 2b by the full deployment of piston 10.

Used dose 3 is thus collected from mobile plate into orifice 5.

In the preferred embodiment, orifice 5 has a section with an identical shape and a slightly larger size that the openings of the brewing chambers 1a and 1b.

In the example in the various figures, brewing chambers 1a and 1b and orifice 5 have a circular section with a diameter that is approximately equal, with a difference of a few millimeters.

Not only does mobile plate 4 take part in ejecting dose 3 out of brewing chambers 1a and 1b, but it also makes it possible to remove the used dose 3 outside the unit.

To that end, the thickness of the perimeter of orifice 5 is almost equal to the maximum height of used dose 3 ejected after brewing.

FIG. 8 clearly shows that configuration.

Besides, the removal of used dose 3 present in orifice 5 takes place by gravity after the movement of mobile plate 4 as shown in FIG. 9.

Used dose 3 can thus be collected in any container.

In the preferred embodiment as shown in the figures, plate 4 is a mobile disc that rotates on a horizontal plane.

Besides, the unit preferentially contains two brewing chambers 1a and 1b, positioned on plate 4.

Orifice 5 and brewing chambers 1a and 1b are placed so that the orifice is placed opposite one of the two chambers 1a or 1b when plate 4 rotates.

That rotation may take place around an axis 13 by means of a motorised system 14 made up of usual elements, particularly a geared motor and a driving system like the one shown in FIGS. 1 and 2.

Likewise, mobile piston 10 may be displaced by a common motorising system referenced 11.

In order to ensure a fully automated beverage brewing cycle, the unit includes an assembly 15 that supplies the brewing material.

Assembly 15 shown in FIG. 1 opens out onto at least one supply channel 16.

Beneath channels 16, a funnel 17 can receive the dose of the brewing material 3 by means of gravity.

Also, the lower end 18 of funnel 17 opens out onto mobile plate 4 as shown in FIG. 2. Funnel 17 shown in the figures has shape that is more or less flared at its upper end as compared to its lower end 18.

However, the invention is not limited to such a configuration and particularly, a funnel with a constant section over its entire height may be used.

In order to load dose 3 into one of the brewing chambers 1a or 1b, it is necessary to position the lower end 18 above one of the chambers 1a or 1b and at the same time, to place opening 5 above it as well.

Positioning means are provided to position funnel 17.

Figure 3:
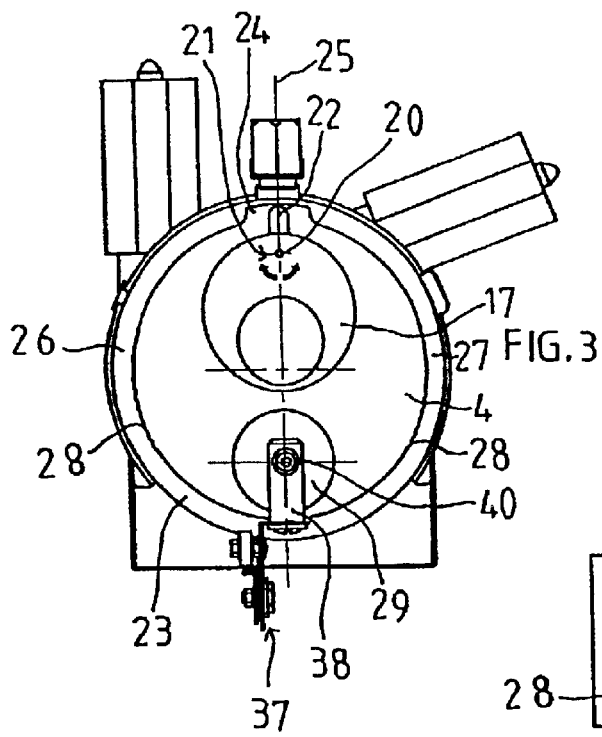
FIGS. 3 to 5 are schematic top views of the unit as described in the invention, illustrating the three possible positions of the mobile plate.

In the preferred embodiment, the means have a pivot link 21 shown schematically in FIG. 3 and a rotation axis referenced 20.

Figure 4:
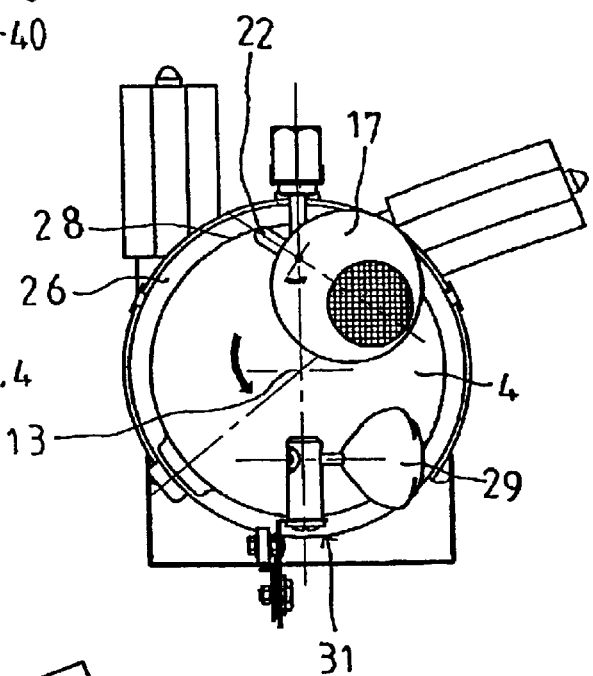
Figure 5:
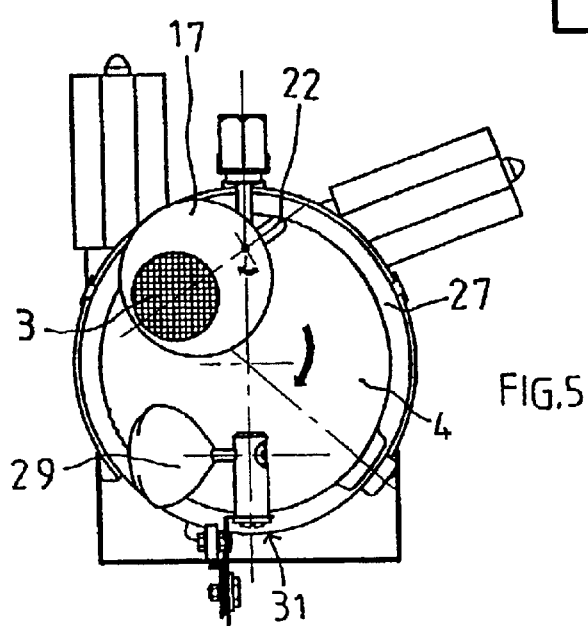

As shown in FIGS. 4 and 5, the pivot link 21 enables funnel 17 to move between a right-hand position and a left-hand position, while making it possible to have an intermediate position as shown in FIG. 3, between the two extreme positions.

A driving system for funnel 17 is provided in order to position the funnel in one of the three configurations shown in FIGS. 3–5.

The positioning means contain a driving pin referenced 22 fixed to the outer wall of funnel 17, which projects out towards the outside of mobile plate 4.

Also, an annular part 23 is built on the perimeter of the mobile plate 4, such as an edge.

That annular part 23 works together with positioning pin 22.

To do so, annular part 23 has a notch 24 in which the pin 22 fits when it is in the idle position as shown in FIG. 3.

It must be considered in the top view that brewing chambers 1a and 1b are formed symmetrically around the idle position, around the symmetry axis referenced 25.

To turn funnel 17 to the right in order to reach the position of FIG. 4, mobile plate 4 is made to rotate in the trigonometric direction so that driving pin 22 presses against the corresponding portion of annular part 23.

In this case, driving pin 22 presses against portion 26 of annular part 23.

To reach the pivoted position shown in FIG. 5, driving pin 22 presses against portion 27 of annular part 23 located on the other side of notch 24.

There too, the displacement of mobile plate 4 ensures such pressing.

It is achieved by rotating mobile plate 4 clockwise from the idle position shown in FIG. 3.

As indicated for the shapes and dimensions of orifice 5 and the opening of brewing chambers 1a and 1b, the lower end 18 of funnel 17 preferentially has a shape and dimensions similar to those of the opening of brewing chambers 1a and 1b.

In that way, the brewing material is transferred without any hindrance.

In order to enable the brewing material to drop into funnel 17 without retaining any of it on the internal walls of funnel 17, the unit has the means to make tunnel vibrate.

Such vibration can particularly be achieved by forming a raised part 28 on the annular part 23 of mobile plate 4 as shown in FIGS. 3 to 5.

These figures show the raised part 28, particularly in the form of stripes on the internal vertical wall of the annular part 23.

The raised part vibrates funnel 17 when driving pin 22 passes over raised part 28.

In another embodiment, the unit includes the means to clean orifice 5 when used dose 3 is removed.

A particular form of removal means has been illustrated in the figures containing a weight 29 mounted on means of suspension 30 used to move weight 29 in and out of orifice 5.

Weight 29 has a section with the same shape and a slightly smaller size than the section of orifice 5.

In that way, weight 29 scrapes the walls of orifice 5 in order to remove any residue of brewing material.

The means of suspension 30 may be achieved as described below.

First of all, a horizontal axis pivot link 31 is formed so that weight 29 can swing depending on the position of plate 4 as shown in the top view in FIGS. 3–5.

Secondly, articulation 32, also referenced in FIG. 1, lowers and raises weight 29 so that it is inserted into and removed from orifice 5.

The axis pivot link 31 may be made up of a support 38 for the weight and a bracket 37 connect to frame 36 of the unit.

Articulation 32 may be formed by the link between bracket 37 and frame 36.

These kinematical links may be made using usual means, particularly using screwed systems.

In the preferred mode, weight 29 is also given freedom of movement in relation to support 38.

To do so, an annular linear link 35 is made up in order to make it easier to move in and out of orifice 5.

For example, the annular linear link is formed by making a orifice 40 that is more or less vertical in support 38, working along with a rod 34, at the lower end of which is fixed weight 29 and mounted on support 38 so that head 39 of rod 34 with a section greater than orifice 40 presses against orifice 40 from the top.

Rod 34 is therefore enabled to move vertically in relation to support 38.

To make it easier for weight 29 to move in and out of orifice 5, a weight 29 will be used preferentially, with a sectional profile 33.

In that way, a weight 29 can be made with a maximum section that is very slightly smaller than that of the section of orifice 5.

The shape of the sectional profile 33 is presented in the various figures, particularly FIG. 2.

It eliminates the risk of weight 29 jamming in orifice 5.

Below is a description of the various unit operating stages in the invention, in the particular embodiment mode illustrated in the figures and particularly FIGS. 6 to 9.

FIG. 6 contains a phase in which a dose of brewing material 3 is introduced in brewing chamber 1b, into its receptacle 2b.

Such introduction is possible by placing the mobile plate 4 in such a way that orifice 5 is above receptacle 2b.

Besides, the positioning of mobile plate 4 drives funnel 17, which is also positioned above the opening of receptacle 2b.

Now the supply assembly 15 can be made to operate to transfer the brewing material (such as ground coffee) into brewing chamber 1b.

As illustrated in FIG. 1, the supply means 15 may contain several grinders 19 that can grind coffee beans to make ground coffee.

When a dose is introduced in this way in brewing chamber 1b, it may be closed by another phase of rotation of mobile plate 4.

Now the position shown in FIG. 7 is possible, where chamber 1b is closed and funnel 17 and weight 29 are in the idle position that is more or less as shown in the top view of FIG. 3.

At this point, the brew may be made by the radial injection of hot water into the brewing chamber 1b through supply circuit 7.

In FIG. 7, arrows illustrate the passage of water from the supply circuit 7 to outlet 41.

The beverage is then collected in the usual way.

Before the brewing phase starts, mobile piston 10 can be raised in order to tamp the brewing material.

When the brewing is completed, the used dose 3 is ejected out of brewing chamber 1b as represented in FIG. 8.

To do so, mobile plate 4 is positioned so that orifice 5 is above the opening of receptacle 2b of brewing chamber 1b.

Now, mobile piston 10 can move so that dose 3 is collected in orifice 5.

A new rotation of mobile plate 4 in the opposite direction makes it possible to remove dose 3 by the action of gravity.

The removal stage is represented in FIG. 9.

To that end, weight 29 makes removal easier and ensures that no brewing material remains on the perimeter of orifice 5.

It must be noted that while the various stages are being performed in brewing chamber 1b, brewing chamber 1a can operate independently.

For instance, FIG. 7 illustrates the possibility of simultaneous brewing in brewing chamber 1b.

Brewing may also continue as brewing chamber 1b is being filled (FIG. 6) or while the used dose 3 is being ejected (FIG. 8) or removed (FIG. 9).

Likewise, the filling, brewing, ejection and removal phases of brewing chamber 1a may occur when brewing chamber 1b is operating.

In the example show, mobile plate 4 rotates around an idle position shown in FIG. 3.

Mobile plate 4 can be made to rotate around that position in either direction depending on the operations to be completed, either vis-à-vis brewing chamber 1b or brewing chamber 1a.

In the preferred mode, all the unit operating cycles are automated in order to optimise the productivity and ease of use for the user.

In particular, it can be seen that the use of such an operating cycle does away with the need to double all the operating controls of brewing chambers 1a and 1b.

Of course, means may be provided to detect the position of mobile plate 4 so that it stops in exactly the different desired positions for the loading, removal and ejection of dose 3 and the closing of chambers 1a and 1b.

REFERENCES 1a, 1b. Brewing chambers
2a, 2b. Receptacle
3. Dose
4. Mobile plate
5. Orifice
6. Seal
7. Radial supply circuit
8. Lateral wall
9. Lower wall
10. Piston
11. Piston motorisation system
12. Brewing solenoid valve
13. Plate rotation axis
14. Plate motorisation system
15. Supply assembly
16. Channel
17. Funnel
18. Lower end
19. Grinders
20. Vertical axis
21. Pivot link
22. Driving pin
23. Annular part
24. Notch
25. Axis of symmetry
26. First portion of the annular part
27. Second portion of the annular part
28. Relief
29. Weight
30. Means of suspension
31. Horizontal axis pivot link
32. Articulation
33. Sectional profile
34. Rod
35. Annular linear link
36. Frame
37. Bracket
38. Support
39. Head of rod
40. Orifice
41. Outlet
42. Filter

What is claimed is:

1. Unit for the brewing of beverages with a dose (3) of product to be brewed, comprising several juxtaposed brewing chambers (1a, 1b), each provided with a receptacle (2a, 2b) for the dose (3) and means for injecting hot water into each of the brewing chambers,
    wherein the means for injecting hot water is in each of the brewing chambers,
    wherein the brewing chambers (1a, 1b) are topped by a mobile plate (4) provided with an orifice (5) designed to be positioned opposite the brewing chambers (1a, 1b) for opening and closing the chambers (1a, 1b) depending on its position, and
    wherein closing of the brewing chambers permits the brewing operation.

2. Unit according to claim 1 characterised by the fact that there is a seal (6) between each brewing chamber (1a, 1b) and the mobile plate (4).

3. Unit according to claim 1, characterised by the fact that the means of injection are made up of radial supply circuits (7) that open out into the two brewing chambers (1a, 1b).

4. Unit according to claim 1, characterised by the fact that the plate (4) is a mobile disc rotating in the horizontal plane, the unit includes two brewing chambers (1a, 1b) positioned under the plate (4) so that they are located on the path of the orifice (5).

5. Automatic machine for making coffee type espresso or other beverages characterised by the fact that
    it includes at least one unit as in claim 1.

6. Unit for the brewing of beverages with a dose of product to be brewed, comprising several juxtaposed brewing chambers each provided with a receptacle for the dose and means for injecting hot water into each of the brewing chambers,
    wherein the brewing chambers are topped by a mobile plate provided with an orifice designed to be positioned opposite the brewing chambers for opening and closing the chambers depending on its position, and
    wherein the lower wall (9) of the receptacle (2a, 2b) is made up by a mobile piston (10) that moves from a dose (3) receiving position to a dose (3) ejection position in the orifice (5) after the dose has been used.

7. Unit according to claim 6, characterised by the fact that the section of the orifice (5) has a shape that is identical and dimensions that are slightly greater than those of the openings of the brewing chambers (1a, 1b).

8. Unit according to claim 7, characterised by the fact that the thickness of the perimeter of the orifice (5) is at least equal to the maximum height of the used dose (3) ejected after brewing,
    the ejected used dose (3) is removed by gravity after the movement of the mobile plate (4).

9. Unit according to claim 8 characterised by the fact that it includes means to clean the orifice (5) when the used dose (3) is removed, including the following:
    a weight (29) with a section of the same shape and a size slightly smaller than the section of the orifice (5),
    means (30) to suspend the weight (29) enabling it to move in and out of the orifice (5).

10. Unit according to claim 9 characterised by the fact that the means of suspension (30) include the following:
    a horizontal axis pivot link (31),
    an articulation (32) to move the weight up and down (29), in order to move the weight (29) in and out of the orifice (5) as the mobile plate (4) is displaced.

11. Unit according to claim 10 characterised by the fact that the weight (29) has a sectional profile (33) so as to make it easier for it to move in and out of the orifice (5).

12. Unit according to claim 10 characterised by the fact that the weight (29) is mounted on a rod (34) connected to a horizontal axis pivot link (31) by an annular linear link (35) in order to facilitate movement in and out of the orifice (5).

13. Unit for the brewing of beverages with a dose of product to be brewed, comprising several juxtaposed brewing chambers, each provided with a receptacle for the dose and means for injecting hot water into each of the brewing chambers, wherein the brewing chambers are topped by a mobile plate provided with an orifice designed to be positioned opposite the brewing chambers for opening and closing the chambers depending on its position, wherein the plate is a mobile disc rotating in the horizontal plane, wherein the unit includes two brewing chambers positioned under the plate so that they are located on the path of the orifice, and wherein the unit includes automated means to load a dose (3) of brewing product including the following:

an assembly (15) to supply the brewing material that opens onto a supply channel (16), a funnel (17) that can receive the dose (3) from the supply channels (16) by gravity, the lower end (18) of which opens out onto the mobile plate (4), means to position the funnel (17) above one of the two brewing chambers (1a, 1b), so as to load a dose (3) in either of the brewing chambers (1a, 1b) when the orifice (5) is positioned above it.

14. Unit according to claim 13 characterised by the fact that the shape and dimensions of the lower end (18) of the funnel (17) are more or less similar to those of the opening of the brewing chambers (1a, 1b).

15. Unit according to claim 13 characterised by the fact that the means for positioning the funnel (17) above one of the brewing chambers (1a, 1b) include the following:

a vertical axis (20) pivot link (21) with a return mechanism, a driving pin (22) fixed to the outer wall of the funnel (17) which works along with an annular part (23) on the perimeter of the mobile plate (4) to direct the funnel (17) into one of the three positions below:

an idle position when the driving pin (22) is fitted in a notch (24) formed on the annular part (23), the brewing chambers (1a, 1b) being arranged symmetrically on either side of the idle position;

a position turned towards one of the brewing chambers (1a, 1b) when the driving pin (22) presses against the portion (26) of the annular part (23) located on one side of the notch (24); a position turned towards the other brewing chamber ((1a, 1b)) when the driving pin (22) presses against the portion (27) of the annular part (23) located on the other side of the notch (24).

16. Unit according to claim 15 characterised by the fact that it has means to vibrate the funnel (17) to make the brewing product drop.

17. Unit according to claim 16 characterised by the fact that at least one area of each portion (26, 27) of the annular part (23) has a raised part (28) to make the funnel (17) vibrate when the driving pin (22) passes over it.

* * * * *